United States Patent
Holland

(10) Patent No.: US 8,922,049 B2
(45) Date of Patent: Dec. 30, 2014

(54) SYSTEM FOR EXTRACTING ELECTRICAL POWER FROM AN ELECTRIC VEHICLE

(75) Inventor: Dewey T. Holland, Martinez, GA (US)

(73) Assignee: Hydrive Vehicles, Incorporated, Martinez, GA (US)

(*) Notice: Subject to any disclaimer, the term of this patent is extended or adjusted under 35 U.S.C. 154(b) by 1063 days.

(21) Appl. No.: 12/958,672

(22) Filed: Dec. 2, 2010

(65) Prior Publication Data
US 2012/0139335 A1    Jun. 7, 2012

(51) Int. Cl.
*B60L 1/00*        (2006.01)
*B60L 3/00*        (2006.01)
*B60L 11/12*       (2006.01)
*B60L 11/18*       (2006.01)

(52) U.S. Cl.
CPC .............. *B60L 1/006* (2013.01); *B60L 3/0069* (2013.01); *B60L 11/126* (2013.01); *B60L 11/1818* (2013.01); *B60L 11/1864* (2013.01); *B60L 11/1877* (2013.01); *Y02T 10/7241* (2013.01); *B60L 2200/22* (2013.01); *B60L 2210/40* (2013.01); *B60L 2230/12* (2013.01); *Y02T 10/7077* (2013.01); *Y02T 10/7088* (2013.01); *Y02T 10/7005* (2013.01); *Y02T 10/7061* (2013.01); *Y02T 90/121* (2013.01); *Y02T 90/14* (2013.01); *Y02T 90/127* (2013.01); *Y02T 10/6217* (2013.01)
USPC .......................................... 307/9.1

(58) Field of Classification Search
CPC .................................. Y02T 10/7241
USPC ........................................ 307/23, 9.1, 10.1
See application file for complete search history.

(56) References Cited

U.S. PATENT DOCUMENTS

| | | | |
|---|---|---|---|
| 5,291,388 A | 3/1994 | Heinrich | |
| 6,198,251 B1 * | 3/2001 | Landon | 320/124 |
| 6,435,293 B1 | 8/2002 | Williams | |
| 6,596,941 B2 | 7/2003 | Tripoli | |
| 6,747,246 B2 * | 6/2004 | Crandell, III | 219/130.1 |
| 7,017,327 B2 | 3/2006 | Hunt et al. | |
| 7,298,627 B2 | 11/2007 | Hussaini et al. | |
| 2001/0050471 A1 | 12/2001 | McCoy et al. | |
| 2004/0239088 A1 | 12/2004 | Rondeau et al. | |
| 2007/0169970 A1 | 7/2007 | Kydd | |
| 2008/0018303 A1 | 1/2008 | Scheucher | |

FOREIGN PATENT DOCUMENTS

JP           11178241 A  *  7/1999 .............. H02J 9/06

OTHER PUBLICATIONS www.theenergyoutlet.net ; "Emergency Power From Your Golf Cart"; at least as of Jun. 30, 2010.
www.ehow.com ; "How to Hook Up Christmas Lights to a Golf Cart Battery" by Athena Hessong; at least as of Jul. 2, 2010.
www.ehow.com ; "How to Use Golf Cart Batteries for Emergency Power" by Richard Laurens; at least as of Jul. 7, 2010.
www.newegg.com ; Tripp Lite PV375 power inverter; at least as of Jul. 7, 2010.

* cited by examiner

*Primary Examiner* — Daniel Cavallari
(74) *Attorney, Agent, or Firm* — Dority & Manning, PA

(57) ABSTRACT

A system is disclosed for extracting electrical power from a plurality of batteries of an electric vehicle for use by an electric device. The system may include a power inverter configured to convert a DC power output of the batteries to an AC power output usable by the electric device. The system may also include a power cable having a first end electrically connected to the batteries and a second end electrically connected to the power inverter such that the DC power output of the batteries is transmitted through the power cable to the power inverter. Additionally, the first end of the power cable may include a charger plug configured to be connected to the batteries through a charging receptacle of the electric vehicle.

9 Claims, 5 Drawing Sheets

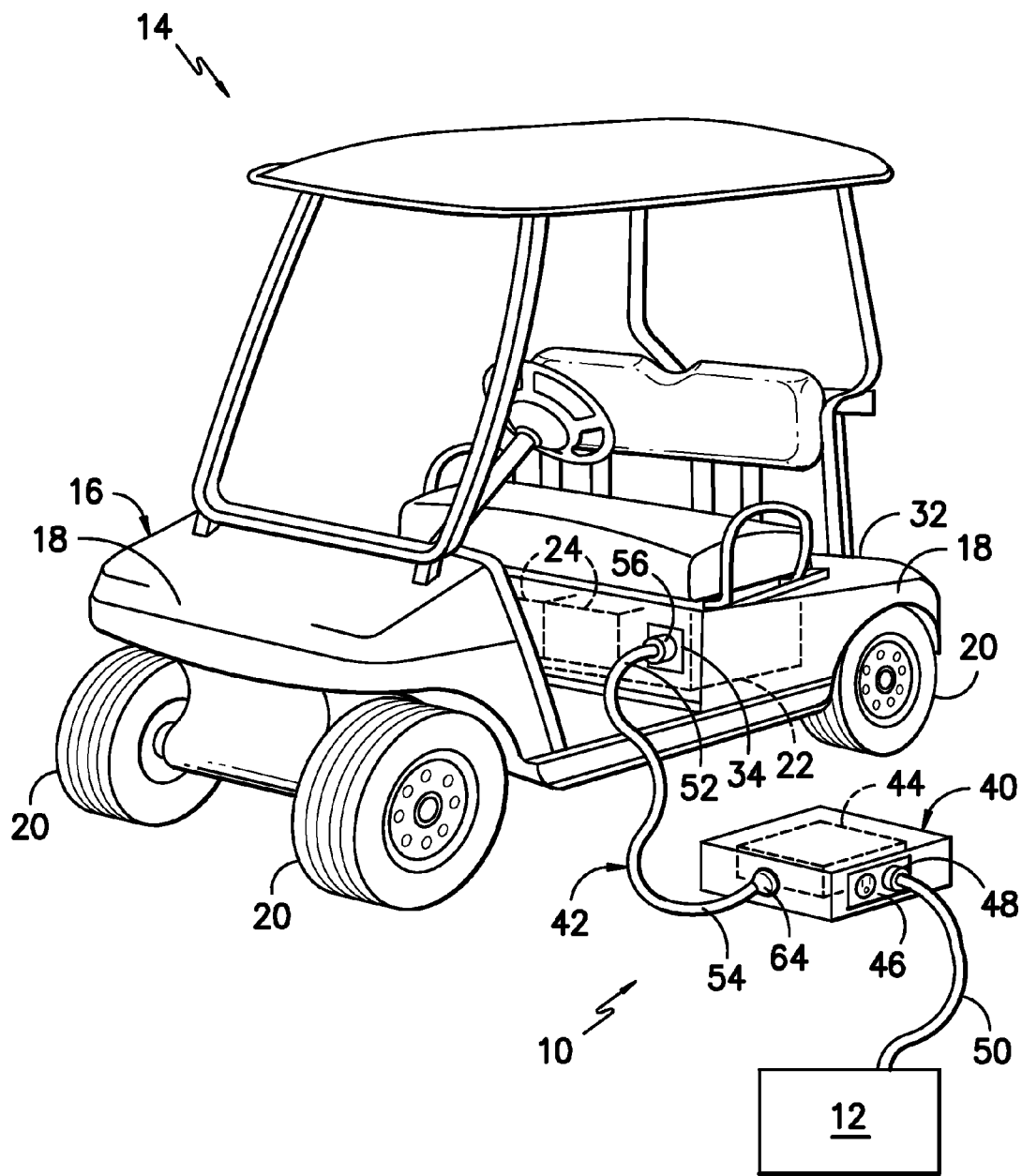
FIG. -1-

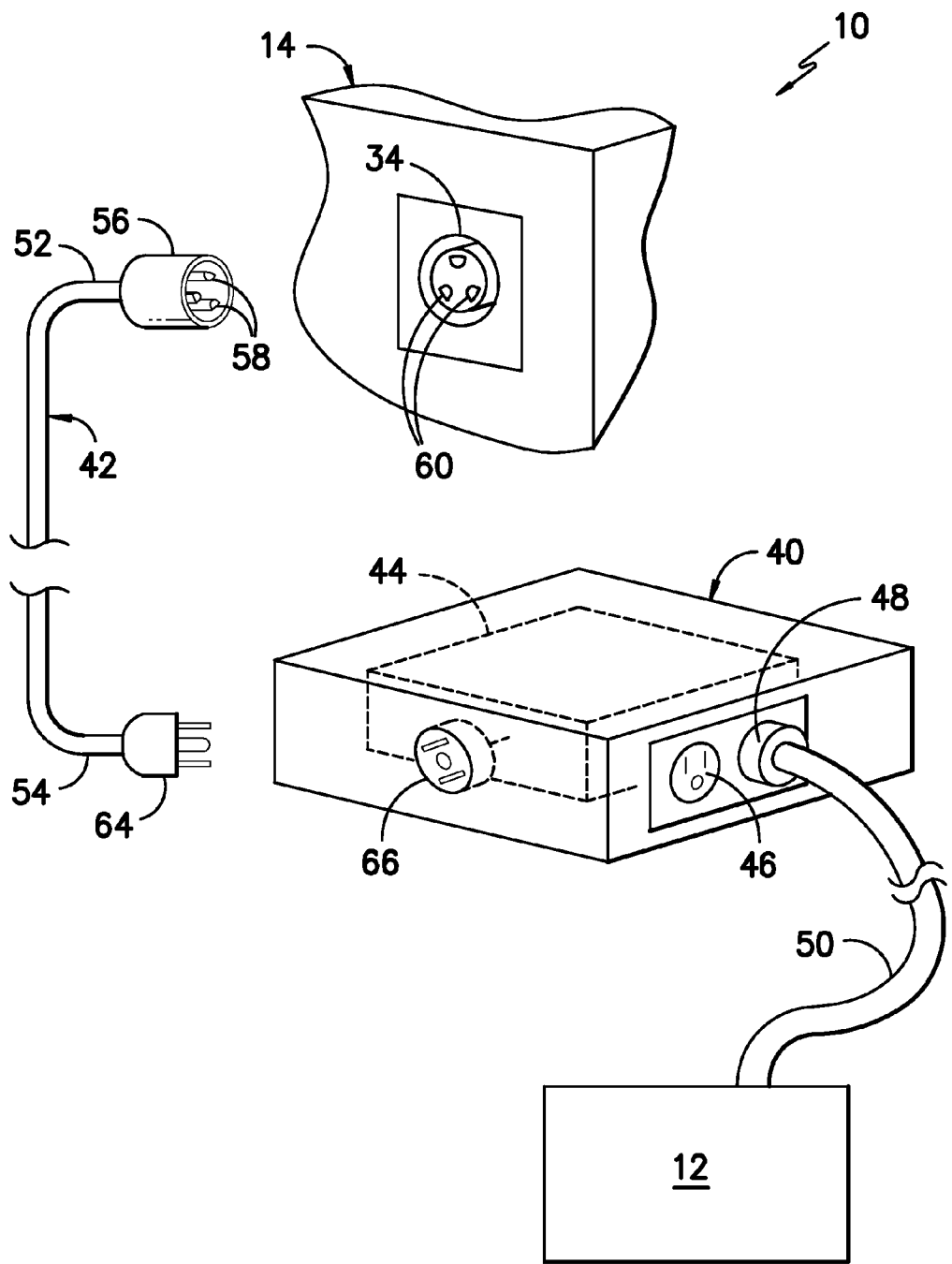
FIG. -2-

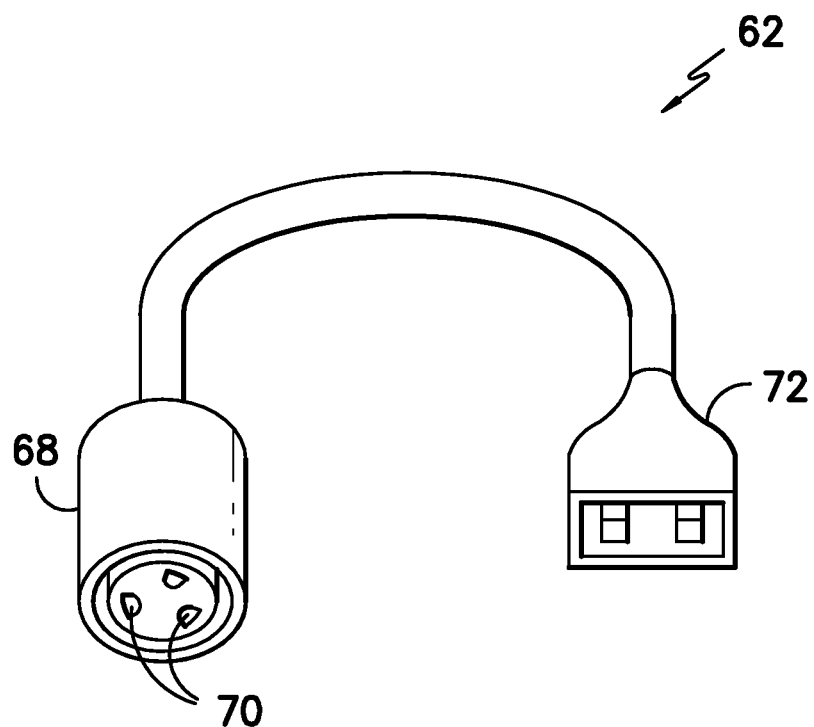
FIG. -3-

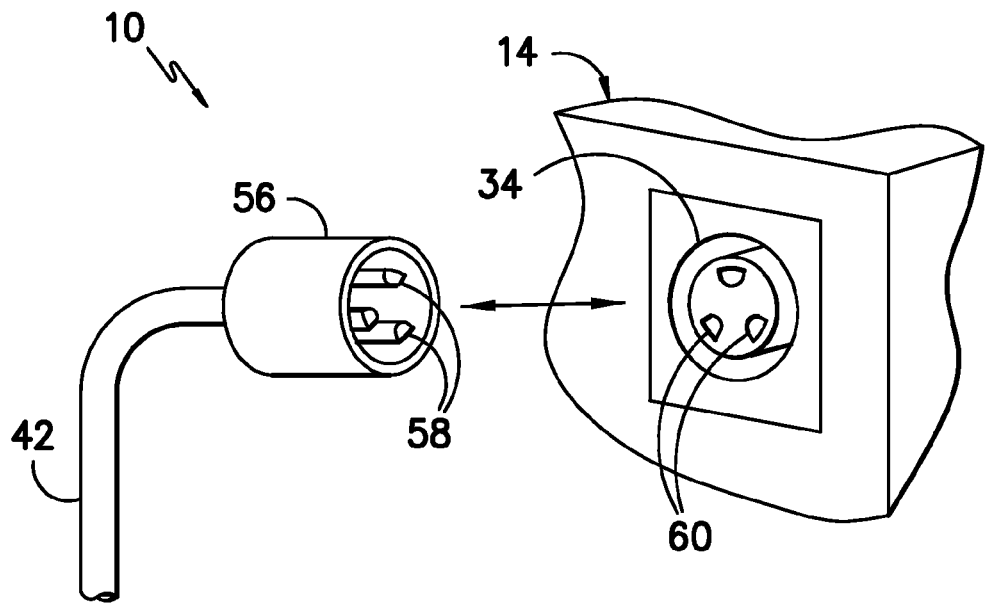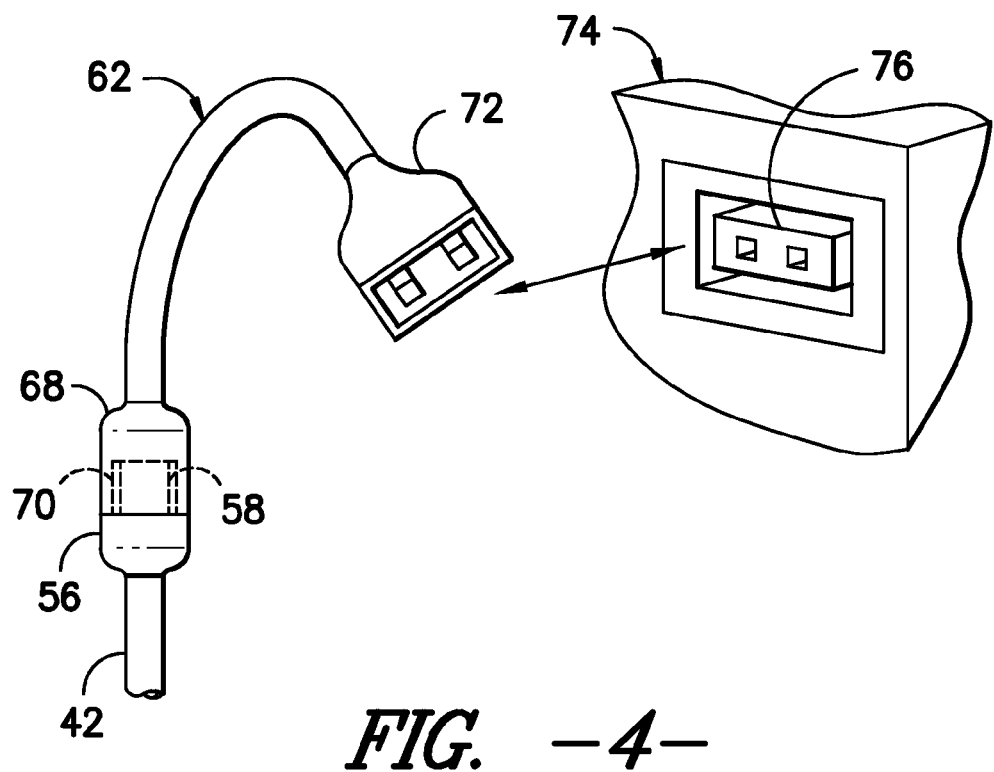
FIG. —4—

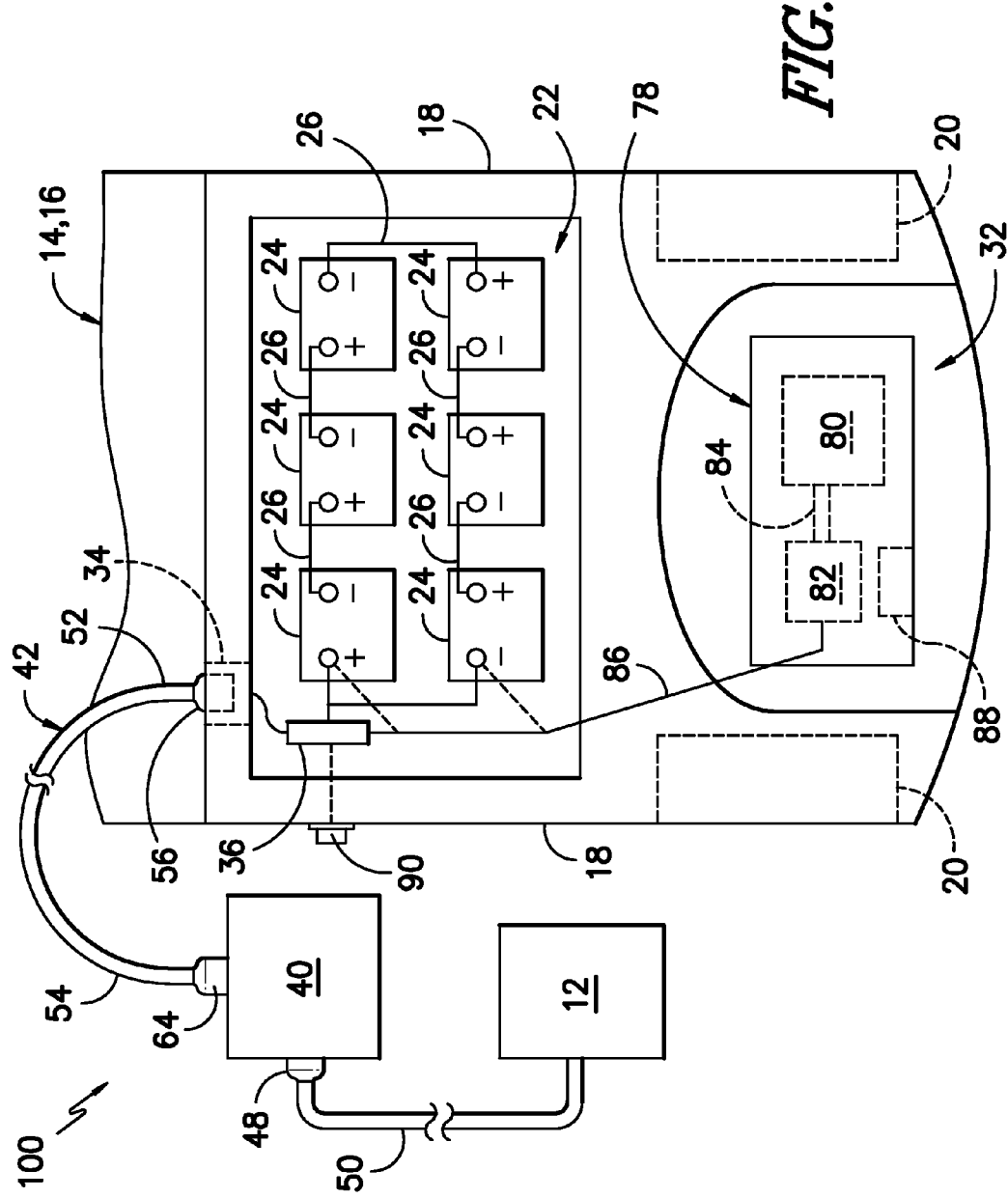
FIG. -5-

SYSTEM FOR EXTRACTING ELECTRICAL POWER FROM AN ELECTRIC VEHICLE

CROSS-REFERENCE TO RELATED APPLICATIONS

This application is related to the concurrently filed U.S. patent application entitled "SYSTEM FOR EXTENDING THE DRIVING RANGE OF AN ELECTRIC VEHICLE," assigned U.S. Ser. No. 12/958,626 and filed Dec. 2, 2010, which is hereby fully incorporated herein by reference for all purposes.

FIELD OF THE INVENTION

The present subject matter relates generally to electric vehicles and, more particularly, to a system for extracting power from the batteries of an electric powered golf car, hunting vehicle or low-speed-vehicle for use by an electric device.

BACKGROUND OF THE INVENTION

Small electric powered vehicles, such as golf cars, hunting vehicles and low-speed-vehicles (LSVs), generally offer an economical and environmentally friendly method of transportation around golf courses, neighborhoods and other low-traffic areas. In addition, such vehicles are often used in remote areas or in locations where electrical power is not readily available. For example, golf cars are often taken camping, hunting, tailgating and to various other locales where electrical outlets are scarce or are otherwise not available. In such locations, it is often necessary that electrical power be available to run one or more electric devices, such as computers, televisions, lights, refrigerators, vacuum cleaners, hedge trimmers, chainsaws and the like, to permit persons to perform tasks (e.g., cooking, cleaning, yard maintenance, work and the like) or to simply provide entertainment. Additionally, it may desirably to have the ability to transfer power out of a fully charged electric vehicle and into a second uncharged vehicle, effectively sharing electric power between the vehicles and rescuing a stranded car.

Golf cars and LSVs typically include lead-acid batteries which are capable of storing between six to eight kilowatt-hours of electrical power when fully charged. In general, this stored power may be capable of running one or more electric devices for several days depending on the power consumption of a particular device. To permit the use of such stored power, power inverters must typically be utilized to convert the batteries' direct-current (DC) power output to the alternating-current (AC) power used by electric devices. However, the installation of a power inverter on a golf car or LSV is often a dangerous task involving serious risk of injury. For example, power inverters are known that include individual wires that may be connected directly to the batteries of such vehicles to enable power to be drawn from the batteries and converted into usable AC power. Unfortunately, unskilled individuals often improperly connect the inverter creating a short or electric spark which can result in a fire or explosion. Due to the serious danger involved in attaching the inverter's wires directly to the batteries, it generally necessary that the installation be performed by a skilled professional. Thus, the average golf car or LSV owner is unable to take advantage of the electrical power stored within the batteries of their vehicles.

Accordingly, there is a need for a system that provides for the efficient and safe extraction of electrical power from the batteries of a golf car or LSV which can be utilized by any vehicle owner.

BRIEF DESCRIPTION OF THE INVENTION

Aspects and advantages of the present subject matter will be set forth in part in the following description, or may be obvious from the description, or may be learned through practice of the present subject matter.

In one aspect, the present subject matter discloses a system for extracting electrical power from a plurality of batteries of an electric vehicle for use by an electric device. The system may include a power inverter configured to convert a DC power output of the batteries to an AC power output usable by the electric device. The system may also include a power cable having a first end electrically connected to the batteries and a second end electrically connected to the power inverter such that the DC power output of the batteries is transmitted through the power cable to the power inverter. Additionally, the first end of the power cable may include a charger plug configured to be connected to the batteries through a charging receptacle of the electric vehicle.

In another aspect, the present subject matter discloses a system for extracting power from a plurality of batteries of an electric vehicle for use by an electric device. The system may include a power inverter configured to convert a DC power output of the batteries to an AC power output usable by the electric device. The power inverter may generally include at least one electrical outlet configured to receive a corresponding electrical plug of the electric device. The system may also include a power cable coupled between the power inverter and the batteries. The power cable may include a charger plug configured to be electrically connected to the batteries through a charging receptacle of the electric vehicle and an outlet plug configured to be received within an input receptacle of the power inverter such that the DC power output of the batteries is transmitted through the power cable to the power inverter. Further, the system may include a generator electrically connected to the batteries, wherein the generator is configured to generate a power output for charging the batteries.

In a further aspect, the present subject matter discloses a system for extracting power from a plurality of batteries of an electric vehicle for use by an electric device. The system may include a power inverter configured to convert a DC power output of the batteries to an AC power output usable by the electric device. The power inverter may generally include at least one electrical outlet configured to receive a corresponding electrical plug of the electric device. The system may also include a power cable coupled between the power inverter and the batteries. The power cable may include a charger plug configured to be electrically connected to the batteries through a charging receptacle of the electric vehicle and an outlet plug configured to be received within an input receptacle of the power inverter such that the DC power output of the batteries is transmitted through the power cable to the power inverter. Further, the system may include a generator electrically connected to the batteries, wherein the generator is configured to generate a power output for charging the batteries. Additionally, the power inverter may include a cut-off feature configured to stop the extraction of power from the batteries when an output voltage of the batteries drops below a predetermined voltage threshold.

These and other features, aspects and advantages of the present subject matter will become better understood with reference to the following description and appended claims. The accompanying drawings, which are incorporated in and constitute a part of this specification, illustrate embodiments of the present subject matter and, together with the description, serve to explain the principles of the present subject matter.

BRIEF DESCRIPTION OF THE DRAWING

A full and enabling disclosure of the present subject matter, including the best mode thereof, directed to one of ordinary skill in the art, is set forth in the specification, which makes reference to the appended figures, in which:

FIG. 1 illustrates a perspective view of one embodiment of a system for extracting power from the batteries of an electric vehicle in accordance with aspects of the present subject matter, particularly illustrating the system being utilized with a golf car;

FIG. 2 illustrates a partial, perspective view of embodiments of many of the components and features of the system illustrated in FIG. 1;

FIG. 3 illustrates a perspective view of one embodiment of an adapter member configured to be utilized with the disclosed system in accordance with aspects of the present subject matter;

FIG. 4 illustrates partial, perspective view of the embodiment of the adapter member illustrated in FIG. 3 being utilized with disclosed system to provide for the extraction of electric power from different electric vehicles in accordance with aspects of the present subject matter; and FIG. 5 illustrates a partial, top view of another embodiment of a system for extracting electrical power from the batteries of an electric vehicle in accordance with aspects of the present subject matter.

DETAILED DESCRIPTION OF THE INVENTION

Reference now will be made in detail to embodiments of the present subject matter, one or more examples of which are illustrated in the drawings. Each example is provided by way of explanation of the present subject matter, not by way of limitation. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

Referring now to the drawings, FIGS. 1-5 illustrate various embodiments of a system 10 for extracting power from an electric vehicle for use by an electric device 12. In general, the system of the present subject matter will be described with reference to a golf car 14. However, the golf car 14 illustrated and described herein is generally provided for illustrative purposes only to place the present system 10 in an exemplary field of use. Thus, one of ordinary skill in the art should appreciate that the present system 10 is not limited to any particular type of golf car configuration. Similarly, it should be appreciated that the present system 10 need not be limited to use with golf cars 14, but may generally be utilized with any electric vehicle. In particular, as used herein, the term "electric vehicle" may refer to golf cars, electric powered hunting vehicles (e.g., all-terrain vehicles) and low-speed vehicles (LSVs). The term "low-speed vehicle" or "LSV" refers to vehicles qualifying as such under Federal Motor Vehicle Safety Standard (FMVSS) 208 promulgated by the U.S. Department of Transportation, National High Traffic Safety Administration, essentially a modified electric golf car for street legal use.

Referring to FIGS. 1, 2 and 5, the illustrated golf car 14 generally comprises a body 16 having outer shell 18 defining the exterior surface and shape of the golf car 14 and a chassis (not illustrated) configured to provide structural support for the various component of the golf car 14. The golf car 14 may also include a plurality of wheels 20 configured to be driven by an electric motor or motors (not illustrated) disposed within the body 16. Additionally, the golf car 14 may include a battery well 22 housing a plurality of batteries 24 configured to supply power to the electric motor. In general, the golf car 14 may include any number of batteries 24. For example, as shown in FIG. 5, in one embodiment, the golf car 14 may include six batteries 24 connected in series by a plurality of cross-over cables 26. In alternative embodiments, the golf car 14 may include less than six batteries 24 or greater than six batteries 24. Additionally, it should be appreciated that the batteries 24 may be configured to output any suitable voltage. For example, in the embodiment shown in FIG. 5, each battery 24 may be rated to output six to eight volts so as to supply a thirty-six or forty-eight volt output to the electric motor of the golf car 14.

Further, the golf car 14 may also include a charging system configured to permit the batteries 24 to be recharged after use. For example, the golf car's charging system may include a charging receptacle 34 electrically connected to the batteries 24. As is generally understood, the charging receptacle 34 may be configured such that a charging cable (not illustrated) of a peripheral charging unit (not illustrated) may be plugged into the receptacle 34 to permit DC power supplied by the peripheral charging unit to be transmitted to and charge the batteries 24. In one embodiment, the charging receptacle 34 may be wired directly to the batteries 24 of the golf car 14 to permit the direct transmission of power from the peripheral charging unit to the batteries 24. Alternatively, as particularly shown in FIG. 5, the charging receptacle 34 may be coupled to the batteries 24 through a charge controller 36 configured to ensure proper charging of the batteries 24. For example, the charge controller 36 may comprise any suitable processing unit/components (e.g., a computer, microcontroller and the like) or any suitable circuitry (e.g., an application specific circuit, module control board/circuit and the like) which is configured to monitor the power input through the charging receptacle 34 and/or monitor the status of the batteries 24 as they are charged. Thus, in one embodiment, the charge controller 36 may be configured to detect the state-of-charge (SOC) of the batteries 24 and stop power input to the batteries 24 once a predetermined SOC is achieved so as to prevent overcharging of the batteries 24. Of course, it should be appreciated that the golf car 14 may generally include any suitable type of charging system and, thus, need not include the exact configuration and/or components illustrated and described herein.

Referring more particularly to FIGS. 1 and 2, one embodiment of the disclosed system 10 is generally illustrated in accordance with aspects of the present subject matter. As shown, the system 10 generally includes a power inverter 40 and a power cable 42 coupled between the power inverter 40 and the golf car 14. In general, the power inverter 40 may be configured to convert the direct-current (DC) power output of the batteries 24 to alternating-current (AC) power for use in powering any suitable electric device 12, such as computers, televisions, lights, refrigerators, yard maintenance equipment and the like. Thus, it should be appreciated that the power inverter 40 may generally comprise any suitable power inverter and/or power converter known in the art which is capable of both receiving DC power as an input and converting such input into an AC power output (e.g., a 110 volt, 60 hertz AC power output). For example, as is generally understood, the power inverter 40 may include an inverter circuit 44 having a plurality of electronic components configured to perform the DC to AC conversion and, in some embodiments, amplify the AC power output. For example, the inverter circuit 44 may include suitable switching elements (e.g., electromechanical switches, switching transistors, oscillating circuits and semiconductor switches), control sensors, control circuits, transformers, filtering elements and the like. Of course, it should be appreciated that the power inverter 40 need not include an inverter circuit 44 but may generally comprise any suitable component(s) configured to covert DC power to AC power.

The power inverter 40 of the present subject matter may also include a plurality of electrical outlets 46 for outputting the converted AC power to one or more electric devices 12. For example, as particularly shown in FIG. 2, the power inverter 40 may include electrical outlets 46 mounted onto an exterior portion of the inverter 40. The electrical outlets 46 may generally be configured to accept a corresponding electrical plug 48 (e.g., a two or three-prong electrical plug) of a power cord 50 of the electric device 12. As such, the electric device 12 may simply be plugged into one of the electrical outlets 46 of the inverter 40 to enable use of AC power output of the inverter 40. Additionally, in a particular embodiment of the present subject matter, one or more of the electrical outlets 46 may be configured as ground-fault current interrupter (GFCI) outlets. Such GFCI outlets may be provided to protect a user of the system 10 from electrical shock when plugging electric devices 12 into the inverter 40.

To permit electrical power to be drawn from the golf car 14, the power cable 42 of the present system 10 may generally be configured to couple the power inverter 40 to the golf car's batteries 24. Thus, the power cable 42 may generally include a first end 52 configured to be electrically connected and/or coupled to the batteries 24 and a second end 54 configured to be electrically connected and/or coupled to the inverter 40. To allow for safe and efficient connecting of the power cable 42 to the batteries 24, the first end 52 of the power cable 42 may generally be configured to be received within and make electrical contact with the charging receptacle 34 of the golf car 14. For example, the first end 52 may be configured similarly to any suitable golf car charger plug known in the art used to couple the batteries 24 of a golf car 14 to a peripheral charging unit (not illustrated). Thus, as particularly shown in FIG. 2, the first end 52 may generally comprise a charger plug 56 having suitable electrical contacts 58 configured to form an electrical connection with the electrical contacts 60 of the charging receptacle 34. As such, the power cable 42 may be configured to make a solid positive and negative connection to the batteries 24 through the vehicle's charging receptacle 34 such that power can be drawn from the batteries 24 and transmitted to the power inverter 40.

It should be appreciated that the particular configuration of the charger plug 56 may generally vary depending on the configuration of the charging receptacle 34 of the electric vehicle with which the present system 10 is being utilized. For example, it is generally known that various different charging plug/receptacle configurations are utilized throughout the golf car industry by different golf manufacturers. Similarly, LSV manufacturers often utilize differing charging plug/receptacle configurations to facilitate charging of LSVs. Thus, it should be appreciated that, in one embodiment, several different power cables 42 may be required to permit the disclosed system 10 to be utilized with differing electric vehicles. Alternatively, as will be described below with reference to FIGS. 3 and 4, the disclosed system 10 may include an adapter member 62 configured to permit the power cable 42 to be electrically connected to the batteries 24 of two different electric vehicles.

Referring still to FIGS. 1 and 2, as indicated above, the second end 54 of the power cable 42 may generally be configured to be electrically connected and/or coupled to the power inverter 40. Thus, in one embodiment, the second end 54 of the power cable 42 may be directly wired into the inverter circuit 44 of the power inverter 40 to permit power from the batteries 24 to be transmitted through the power cable 42 to the inverter 40. Alternatively, as shown in FIG. 2, the second end 54 of the power cable 42 may include an output plug 64 configured to be received within a corresponding input receptacle 66 of the power inverter 40. The input receptacle 66 may then be wired or otherwise electrically connected to the inverter circuit 44 or other suitable components of the power inverter 40 to permit the DC power output of the batteries 24 to be converted to an AC power output usable by the electric device 12. It should be appreciated that, by using a standard input receptacle 66 and output plug 64, numerous different power cables 42 having varying charger plug configurations may be easily connected to and/or disconnected from the power inverter 40. As such, the power inverter 40 may be configured to work with the various different charging plug/receptacle configurations utilized by golf car and LSV manufacturers by simply replacing one power cable 42 with another that includes a charger plug 56 corresponding to a particular vehicle's charging plug/receptacle configuration.

It should also be appreciated that, in several embodiments of the present subject matter, the power inverter 40 of the disclosed system 10 may include a cut-off feature to ensure that the batteries 24 of the golf car 14 are not depleted to the extent that they are damaged or otherwise cause the golf car 14 to be rendered inoperative. As such, in one embodiment, the power inverter 40 may be configured to cut-off or otherwise stop extracting power from the batteries 24 when the voltage output of the batteries 24 falls below a predetermined voltage threshold. For example, the power inverter 40 may be configured to cut-off when the voltage output of the batteries 24 falls below a certain percentage of the batteries' rated voltage, such as less than about 10% of the rated voltage of the batteries 24. Thus, in an embodiment in which the batteries 24 were rated to output a total of thirty-six volts, the power inverter 40 may be configured to stop extracting power from the batteries 24 when the total voltage output becomes less than about 32.4 volts.

In general, it should be appreciated that the cut-off feature of the power inverter 40 may be implemented using any suitable means. For instance, in one embodiment, the inverter circuit 44 of the inverter 40 may be configured to implement the cut-off feature, such as by including hard-wired logic and/or programmed logic adapted to analyze the voltage output of the batteries 24 and compare such voltage output to the predetermined voltage threshold. Alternatively, the power inverter 40 may include a separate control circuit or processing unit configured to analyze and compare the voltage output of the batteries 24.

It should also be appreciated that, although the power inverter 40 is generally illustrated herein as being disposed apart from the golf car 14, the inverter 40 may generally be disposed at any suitable location relative to the golf car 14. For example, in one embodiment, the power inverter 40 may be mounted onto the golf car 14, such as onto a portion of the outer shell 18 of the body 16 or onto any other suitable location. Alternatively, the power inverter may be disposed within an interior portion of the golf car 14, such as within the battery well 22. In such an embodiment, the inverter 40 may be configured to be directly connected to the batteries 24 and to output converted AC power to an electrical outlet (not illustrated) mounted onto the exterior of the golf cart 14 (e.g., onto the outer shell 18) to permit a user of the system 10 to connect any suitable electric device 12 to the inverter 40 without the need to access an interior portion of the golf car 14.

Referring now to FIGS. 3 and 4, one embodiment of an adapter member 62 that may be utilized with the system 10 of the present subject matter is illustrated. As particularly shown in FIG. 3, the adapter member 62 may generally include an adapter receptacle 68 configured to receive the charger plug 56 of the power cable 42 such that an electrical connection can be made between the adapter member 62 and the power cable 42. For example, the adapter receptacle 68 may generally be configured the same or similar to the charging receptacle 34 in which the charger plug 56 is configured to be received. As such, the electrical contacts 58 of the charger plug 56 may be configured to form an electrical connection with the contacts 70 of the adapter receptacle 68 to permit the transfer of electrical power from the adapter member 62 to the power cable 42.

Additionally, the adapter member 62 may also include an adapter plug 72 disposed opposite the adapter receptacle 58. The adapter plug 72 may generally be configured to be received within and make electrical contact with a charging receptacle having a configuration different than the charging receptacle 34 in which the charger plug 56 is configured to be received (e.g., a charging receptacle 76 of a second electric vehicle 74 (FIG. 4)). As such, the disclosed system 10 may be configured to draw power from the batteries 24 of electric vehicles having charging receptacles 34, 76 of varying configurations.

For example, in the embodiment illustrated in FIG. 4, the charger plug 56 of the power cable 42 may be configured to be received within and make electrical contact with the charging receptacle 34 of the golf car 14 illustrated in FIGS. 1 and 2. Additionally, the adapter plug 72 may be configured to be received within and make electrical contact with the charging receptacle 76 of a second electric vehicle 74 (e.g., a golf car or LSV having a differing receptacle configuration). Thus, when it is desired that electrical power be extracted from the batteries 24 of the golf car 14, the charger plug 56 may simply be plugged into the charging receptacle 34 of the golf car 14. Alternatively, when it is desired that electrical power be extracted from the batteries (not illustrated) of the second electric vehicle 74, the charger plug 56 may be connected to the adapter receptacle 68 and the adapter plug 72 may be inserted into the charging receptacle 76 of the second electric vehicle 74.

Referring now to FIG. 5, there is illustrated another embodiment of a system 100 for extracting power from an electric vehicle for use by an electric device 12, particularly illustrating a top view of a portion of the electric vehicle (i.e., the portion of the golf car 14 including the battery well 22 and the bag well 32 used to store golf bags and the like). In general, the system 100 may include the same or similar components as the system 10 described above with reference to FIGS. 1-4. Thus, the system 100 may include a power inverter 40 configured to convert DC power to AC power and a power cable 42 configured to couple the inverter 40 to the charging receptacle 34 of the golf car 14 such that power may be drawn from the golf car's batteries 24 for use by an electric device 12. In addition, the illustrated system 100 may also include a generator 78 configured to recharge the golf car's batteries 24. Accordingly, the disclosed system 100 may be utilized for a longer period of time, as the power drawn from the batteries 24 may be replenished by the generator 78.

In general, it should be appreciated that the generator 78 of the present subject matter may comprise any suitable generator known in the art which is capable of recharging the batteries 24 of an electric vehicle (e.g., the golf car 14). For example, as shown in FIG. 5, in one embodiment, the generator 78 may comprise an internal combustion engine 80 coupled to one or more alternators 82. As is generally understood, the internal combustion engine 80 may be configured to combust any suitable fuel (e.g., gasoline, diesel fuel, propane or the like) so as to produce a rotational output adapted to drive the alternator 82. For example, in one embodiment, a shaft 84 of the engine 80 may be directly coupled to the alternator 82 to permit the rotational output of the engine 80 to be transferred to the alternator 82. Alternatively, the rotational output of the internal combustion engine 80 may be transmitted to the alternator 82 using any other suitable means, such as by using a belt and pulley mechanism or other suitable mechanism. The alternator 82 may then be configured to convert the rotational energy produced by the engine 80 to electrical power which may be utilized to charge the batteries 24 of the golf car 14. It should be appreciated by those of ordinary skill in the art that the generator 78 may also include additional components and/or features not described or illustrated herein. For example, the generator 78 may also include a starter motor for starting the internal combustion engine 80.

To permit the electrical power generated by the generator 78 to be transmitted to the batteries 24, a generator cable 86 may be connected between the generator 78 and the batteries 24. For example, in one embodiment, the generator 78 may be directly connected to the batteries 24 through the generator cable 86. Thus, as shown by the dashed lines in FIG. 5, the generator cable 78 may be configured to be wired directly to the batteries 24. In such an embodiment, it may be desirable that the generator 78 include a generator control system 88 configured to control the power output of the generator 78 so as to ensure that the batteries 24 are not overcharged and thereby damaged. For example, in one embodiment, the control system 88 may comprise any suitable processing unit (e.g., a computer, microcontroller and the like) or any suitable circuitry (e.g., an application specific circuit, module control board/circuit and the like) configured to implement a charging algorithm (e.g., in the form of computer readable software instructions or hard-wired logic) designed to control the output of the generator 78. For instance, in one embodiment, the charging algorithm implemented by the control system 88 may configure the generator 78 to halt or limit power generation when the SOC of the batteries 24 reaches a predetermined threshold, such as a SOC of from about 75% to about 85% of the batteries' storage capacity.

In an alternative embodiment, the generator cable 86 may be coupled to the batteries 24 through a component of the vehicle's charging system. For instance, a shown in FIG. 5, the generator cable 86 may be connected to the charge controller 36 of the charging system. As such, the charge controller 36 may be configured to control and/or monitor the status of the electrical power transmitted by the generator 78 in order to prevent overcharging of the batteries 24.

Further, in addition to supplying electrical power to the batteries 24, the disclosed system 100 may also be configured such that generator may supply power directly to the power inverter 40. For example, in embodiments in which the generator 78 is coupled to the batteries 24 through the charge controller 36 of the golf car 14, the charge controller 36 may include an internal switch (not illustrated) permitting the flow of electrical power supplied by the generator 78 to be toggled between the batteries 24 and the charging receptacle 34. Additionally, a control switch or button 90 may be coupled to the internal switch of the charge controller 36 to manipulate or otherwise actuate the internal switch and thereby toggle the flow of electricity between the batteries 24 and the charging receptacle 34. For example, as shown in FIG. 5, a mechanical switch/button 90 may be disposed on a surface of the outer shell 18 of the golf car 14 generally adjacent the battery well 22 to permit a user of the system to direct the flow of electricity to either the batteries 24 for recharging or the charging receptacle 34 for transmission through the power cable 42 to the power inverter 40. Of course, it should be appreciated by those of ordinary skill in the art that the control switch/button 90 need not be disposed in the location shown in FIG. 5, but may generally be disposed at any accessible location on the golf car 14, such as on the dashboard, on the steering wheel, or adjacent to the charging receptacle 36.

It should also be appreciated that the generator 78 of the disclosed system 100 may generally be disposed at any suitable location on or within the golf car 14. For example, in the embodiment shown in FIG. 5, the generator 78 is disposed within the bag well 32 of the golf car 14. However, in alternative embodiments, the generator may be disposed within the battery well 22, mounted to a portion of the body 16 of the golf car 14 or otherwise disposed at any other suitable location.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for extracting electrical power from a plurality of batteries of an electric vehicle for use by an electric device, the system comprising:

a power inverter configured to convert a DC power output of the plurality of batteries to an AC power output usable by the electric device; and a power cable having a first end electrically connected to the plurality of batteries and a second end electrically connected to the power inverter such that the DC power output of the plurality of batteries is transmitted through the power cable to the power inverter, wherein the first end of the power cable includes a charger plug configured to be connected to the plurality of batteries through a charging receptacle of the electric vehicle, the charger plug being unidirectional such that power is only extracted from the plurality of batteries and delivered through the power cable to the power inverter when the charger plug is connected to the charging receptacle, wherein the electric vehicle comprises one of a golf car, an all-terrain vehicle or a low-speed vehicle.

2. The system of claim 1, wherein the power inverter includes at least one AC electrical outlet configured to receive a corresponding electrical plug of the electric device.

3. The system of claim 2, wherein the at least AC one electrical outlet is configured as a ground-fault circuit interrupter outlet.

4. The system of claim 1, wherein the second end of the power cable includes an output plug configured to be received within an input receptacle of the power inverter such that the DC power output of the plurality of batteries is transmitted through the power cable to the power inverter.

5. The system of claim 1, wherein the power inverter is configured to stop the extraction of power from the plurality of batteries when an output voltage of the plurality of batteries drops below a predetermined voltage threshold.

6. The system of claim 5, wherein the predetermined voltage threshold is equal to about 10% less than the rated voltage of the plurality of batteries.

7. The system of claim 1, further comprising an adapter member having an adapter receptacle and an adapter plug, the adapter receptacle being configured to be connected to the charger plug of the power cable, the adapter plug being configured to be connected to a charging receptacle of a second electric vehicle.

8. The system of claim 1, wherein the electric vehicle comprises one of the golf car or the all-terrain vehicle.

9. The system of claim 1, wherein the electric vehicle comprises the golf car.

\* \* \* \* \*